United States Patent
Ishibashi (10) Patent No.: US 10,067,322 B2
(45) Date of Patent: Sep. 4, 2018

(54) OPTICAL SYSTEM, AND OPTICAL APPARATUS INCLUDING THE SAME

(71) Applicant: CANON KABUSHIKI KAISHA, Tokyo (JP)

(72) Inventor: Tomohiko Ishibashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 14/940,284

(22) Filed: Nov. 13, 2015

(65) Prior Publication Data

US 2016/0139385 A1    May 19, 2016

(30) Foreign Application Priority Data

Nov. 19, 2014  (JP) .................. 2014-234952

(51) Int. Cl.
   G02B 9/64      (2006.01)
   G02B 15/177    (2006.01)
   G02B 15/14     (2006.01)
   G02B 27/00     (2006.01)

(52) U.S. Cl.
   CPC ........... G02B 15/177 (2013.01); G02B 15/14 (2013.01); G02B 27/0025 (2013.01)

(58) Field of Classification Search
   CPC ...... G02B 15/177; G02B 13/04; G02B 13/22; G02B 13/16; G02B 13/18; G02B 15/14; G02B 27/0025; G02B 15/161; G02B 15/15; G02B 9/04; G02B 9/12; G02B 9/64
   USPC ........ 359/680, 682, 691, 684, 793, 784, 754
   See application file for complete search history.

(56) References Cited

U.S. PATENT DOCUMENTS

2009/0213472 A1*  8/2009  Eguchi ................. G02B 5/1895
                                                          359/682

FOREIGN PATENT DOCUMENTS

| JP | H08313803 A   | 11/1996 |
|----|---------------|---------|
| JP | 2009-198855 A | 9/2009  |
| JP | 2011-013469 A | 1/2011  |
| JP | 2014-202952 A | 10/2014 |

OTHER PUBLICATIONS

"Ohara Inc. :L-TIM, L-LAH." Ohara. Web. Oct. 21, 2017 <http://www.ohara-inc.co.jp/en/product/optical/list/>.*

* cited by examiner

*Primary Examiner* — Bumsuk Won
*Assistant Examiner* — Henry Duong
(74) *Attorney, Agent, or Firm* — Carter, DeLuca, Farrell & Schmidt, LLP (57) ABSTRACT

Provided is an optical system including, in order from an object side to an image side, a first lens unit and a second lens unit with a positive refractive power. One of lenses of the first lens unit is the closest to the object side and has a negative refractive power. The second lens unit includes an aperture diaphragm. One of lenses that is included in the second lens unit, located on the object side or the image side of the aperture diaphragm and the closest to the aperture diaphragm has a concave lens surface that faces the aperture diaphragm. Conditions are satisfied whose values are set by using refractive indexes of a negative lens and a positive lens of the first lens unit that respectively have the smallest Abbe number.

11 Claims, 5 Drawing Sheets

OPTICAL SYSTEM, AND OPTICAL APPARATUS INCLUDING THE SAME

BACKGROUND OF THE INVENTION

Field of the Invention

The present invention relates to an optical system, and an optical apparatus including the same.

Description of the Related Art

Japanese Patent Laid-Open Nos. ("JPs") 2011-13469 and 2009-198855 each propose a configuration that has a small F-number, is usable for a range from a wide angle of view to a normal angle of view, and disposes a lens unit having a positive or negative refractive index on an object side of a so-called Gauss-type optical system that includes lens units each having a positive refractive power that are disposed approximately symmetrically with respect to an aperture diaphragm.

In order for such an optical system with a small F-number to achieve a high optical performance, it is important to sufficiently correct the curvature of field, astigmatism, and chromatic aberration. The Gauss-type optical systems disclosed in JPs 2011-13469 and 2009-198855 can sufficiently reduce the astigmatism by making small a Petzval sum, but may fail to sufficiently reduce the chromatic aberration (specifically, longitudinal chromatic aberration and lateral chromatic aberration).

SUMMARY OF THE INVENTION

The present invention provides an optical system capable of reducing a chromatic aberration so as to achieve a high optical performance, and an optical apparatus including the optical system.

An optical system as an aspect of the present invention includes, in order from an object side to an image side, a first lens unit, and a second lens unit with a positive refractive power. The first lens unit includes a positive lens and a negative lens. One of the lenses of the first lens unit is the closest to the object side and has a negative refractive power. The second lens unit includes a plurality of lenses and an aperture diaphragm. One of the lenses that is included in the second lens unit, located on the object side or the image side of the aperture diaphragm and the closest to the aperture diaphragm has a concave lens surface that faces the aperture diaphragm. When nd1n represents a refractive index of a first negative lens having the smallest Abbe number in the negative lens included in the first lens unit, vd1n represents the Abbe number of the first negative lens, nd1p represents a refractive index of a first positive lens having the smallest Abbe number in the positive lens included in the first lens unit, and vd1p represents the Abbe number of the first positive lens, the following conditions are satisfied:

$$-0.50 \leq nd1n-(-0.014vd1n+2.27) \leq -0.08; \text{ and}$$

$$0.04 \leq nd1p-(-0.014vd1p+2.27) \leq 0.50.$$

Further features of the present invention will become apparent from the following description of exemplary embodiments (with reference to the attached drawings).

DESCRIPTION OF THE EMBODIMENTS

Figure 5:
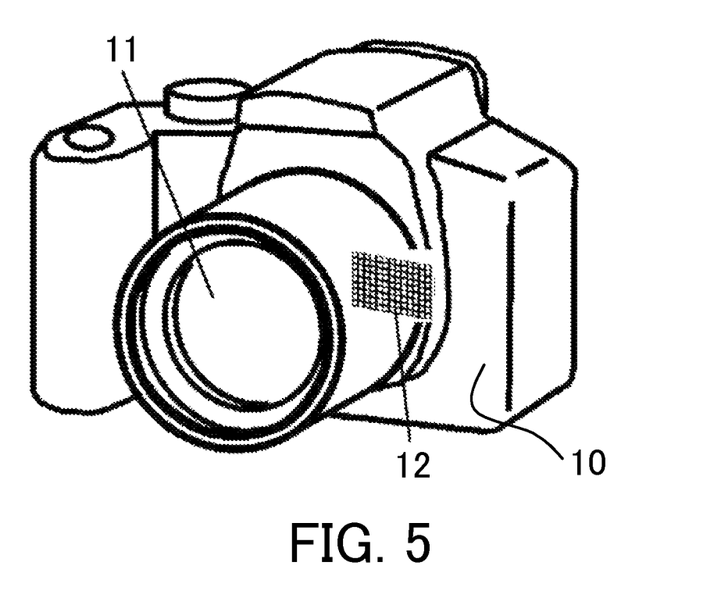
FIG. 5 is a perspective view of an optical apparatus according to each of Embodiments 1, 2, 3, and 4 of the present invention.

FIG. 5 is a schematic perspective view of an image-pickup apparatus that is an example of an optical apparatus including an optical system according to each of embodiments. Each of the optical systems according to the embodiments is applicable to the image-pickup apparatus such as a video camera, a digital still camera, a film camera, a single-reflex camera, a non-reflex camera, and a surveillance camera. In addition, each of the optical systems according to the embodiments may be applied to optical apparatuses other than the image-pickup apparatus such as binoculars, projectors, and copiers.

In FIG. 5, reference numeral 10 denotes a camera body (image-pickup apparatus body), reference numeral 11 denotes an image-pickup optical system to which each of the optical systems according to the embodiments is applicable, and reference numeral 12 denotes an image sensor (solid-state image sensor) that photoelectrically converts an object image formed by the image-pickup optical system 11. Applying each of the optical systems according to the embodiments can achieve the image-pickup apparatus having a high optical performance. Moreover, use of an electronic image sensor, such as a CCD, as the solid-state image sensor enables electronic correction of aberrations such as distortion and chromatic aberration, making it easier to increase quality of an output image.

Figure 1A:
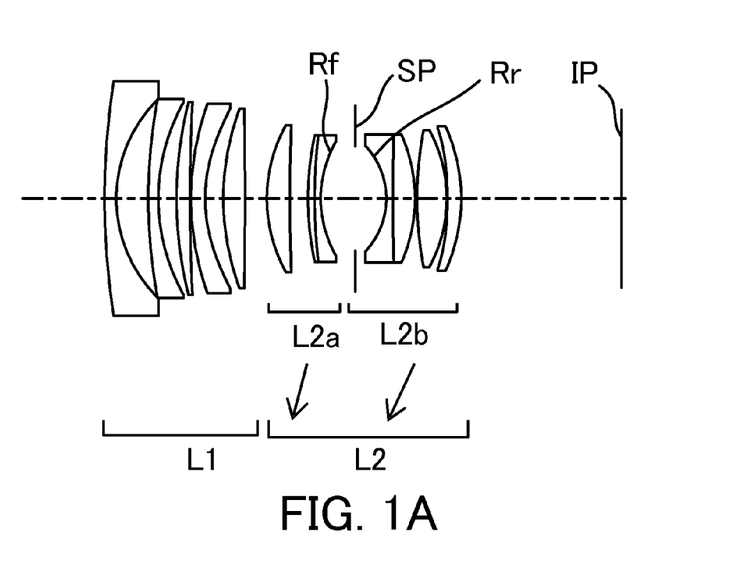
FIGS. 1A and 1B are respectively a sectional view and an aberration diagram of an optical system according to Embodiment 1 of the present invention being focused on an infinity object.
Figure 1B:
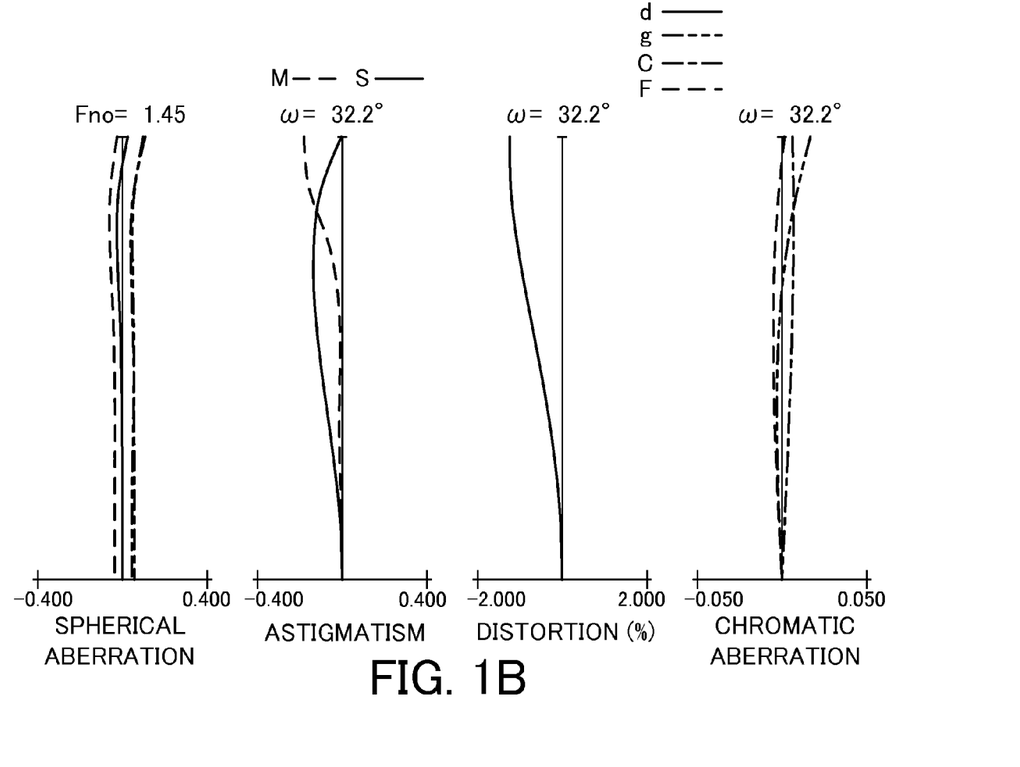
Figure 2A:
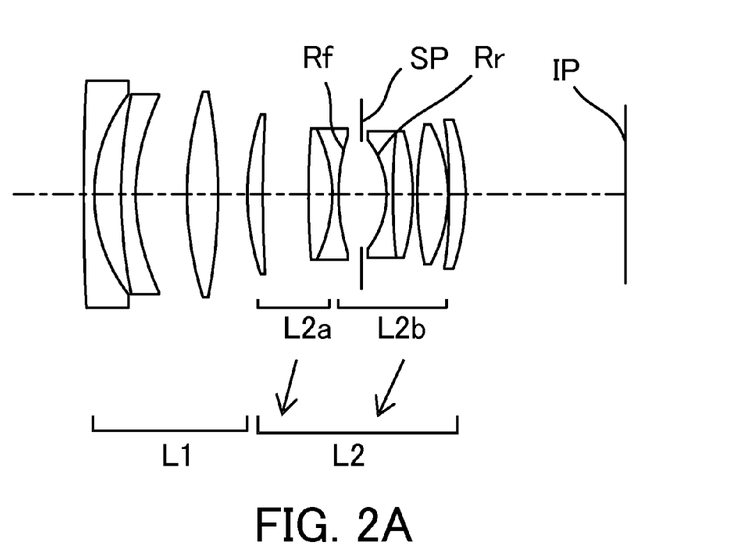
FIGS. 2A and 2B are respectively a sectional view and an aberration diagram of an optical system according to Embodiment 2 of the present invention being focused on the infinity object.
Figure 2B:
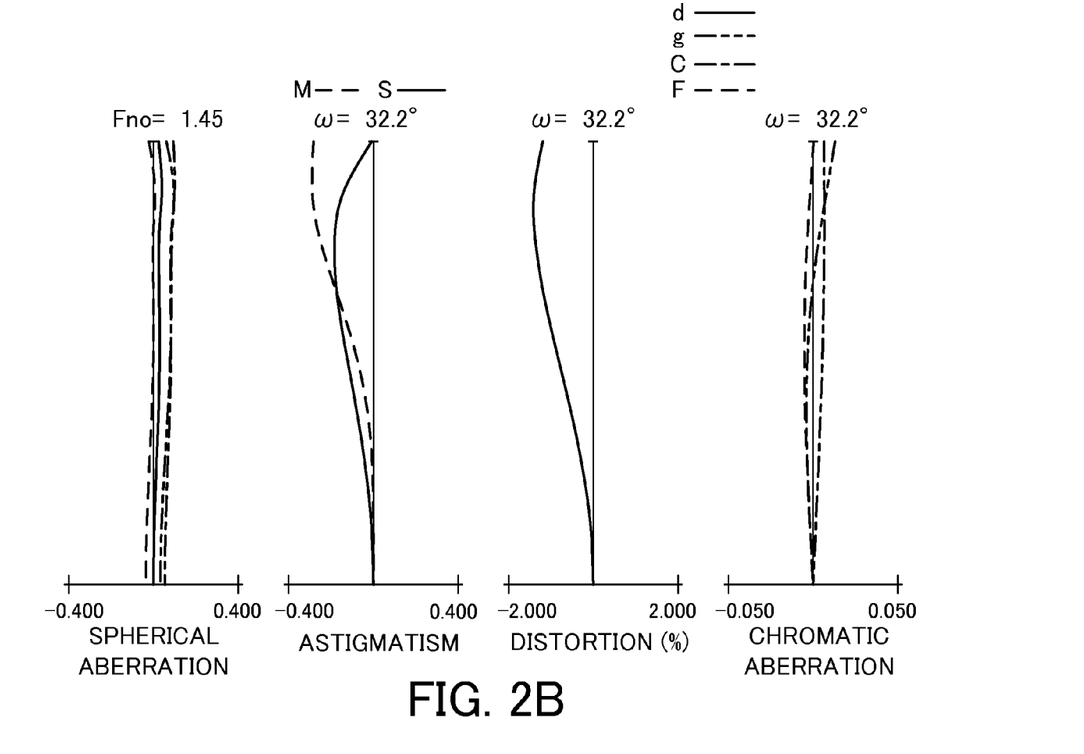
Figure 3A:
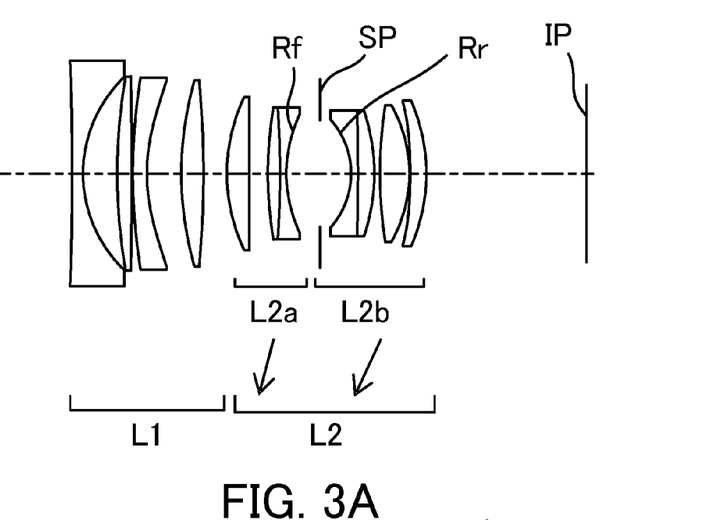
FIGS. 3A and 3B are respectively a sectional view and an aberration diagram of an optical system according to Embodiment 3 of the present invention being focused on the infinity object.
Figure 3B:
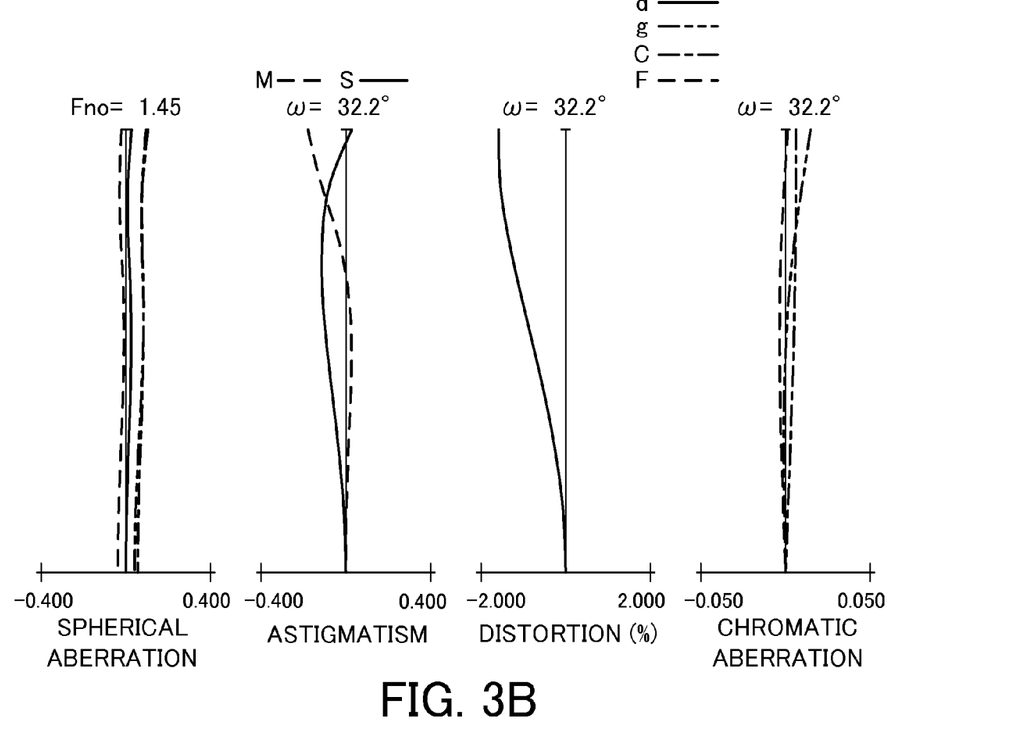
Figure 4A:
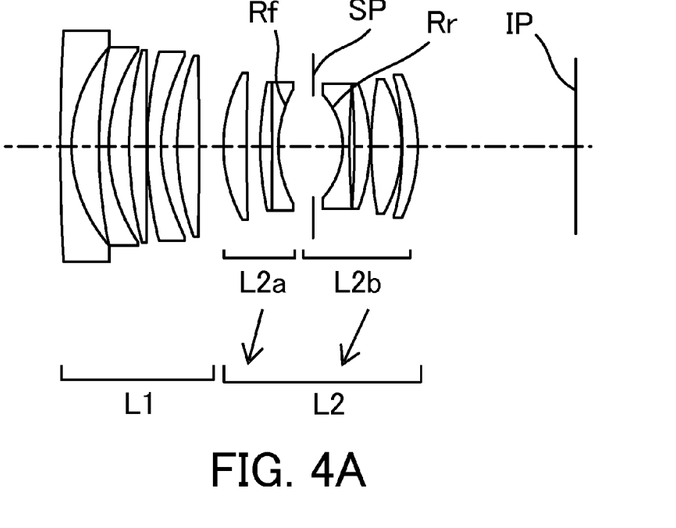
FIGS. 4A and 4B are respectively a sectional view and an aberration diagram of an optical system according to Embodiment 4 of the present invention being focused on the infinity object.
Figure 4B:
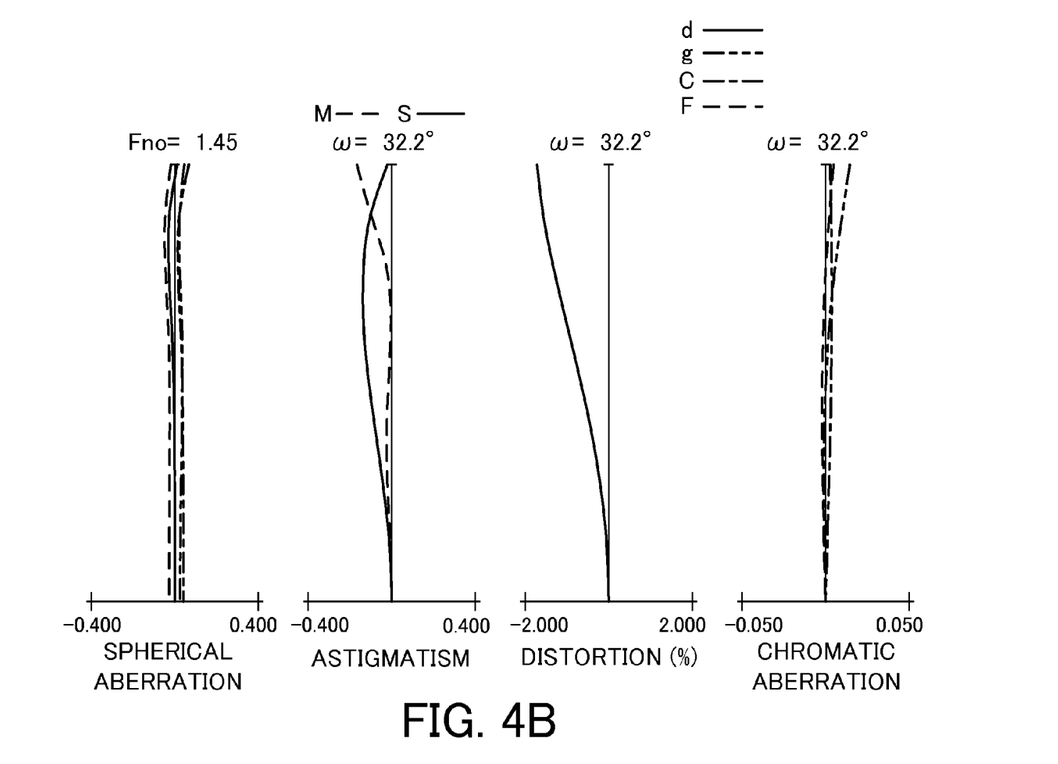

FIGS. 1A and 1B are respectively a sectional view and an aberration diagram of the optical system according to Embodiment 1 being focused on an infinity object. FIGS. 2A and 2B are respectively a sectional view and an aberration diagram of the optical system according to Embodiment 2 being focused on the infinity object. FIGS. 3A and 3B are respectively a sectional view and an aberration diagram of the optical system according to Embodiment 3 being focused on the infinity object. FIGS. 4A and 4B are respectively a sectional view and an aberration diagram of the optical system according to Embodiment 4 being focused on the infinity object.

Each of the optical systems according to the embodiments includes, in order from an object side to an image side, a first lens unit L1 with a positive or negative refractive power, and a second lens unit L2 with a positive refractive power. The first lens unit includes a positive lens, and a negative lens (each of which may be plural). The second lens unit L2 includes a plurality of lenses, and an aperture diaphragm SP. One of the lenses that is included in the second lens unit L2, located on the object side or the image side of the aperture diaphragm SP and the closest to the aperture diaphragm SP has a concave lens surface that faces the aperture diaphragm SP. When i represents order of each of the lens units from the object side, Li represents an i-th lens unit.

Herein, "the lens unit" means grouped lenses that are integrally moved in focusing while varying distances among them in an optical axis direction. In addition, grouped lenses that are shifted in a direction orthogonal to an optical axis for image stabilization, and those integrally moved in zooming can be each regarded as the lens unit.

In each of FIGS. 1A, 2A, 3A, and 4A, a dashed-dotted line indicates the optical axis of the optical system, and a left side and a right side are respectively the object side (front side) and the image side (rear side). When each of the optical systems according to the embodiments is used as a projection lens of the projector or the like, the left side is a projection plane (screen) side, and the right side is an original image side from which an original image is to be projected toward the projection plane. IP represents the image plane on which an image-pickup plane of the solid-state image sensor is located when each of the optical systems is used for the image-pickup apparatus and on which an exposure plane corresponding to a surface of a film is located when each of the optical systems is used for the film camera.

When $n\lambda$ represents a refractive index of a material to a ray with a wavelength $\lambda$, and ng, nF, nd, and nC respectively represent refractive indexes of the material to the g-line (435.8 nm), F-line (486.1 nm), d-line (587.6 nm), and C-line (656.3 nm), each of which is a Fraunhofer line, and an Abbe number $vd$ of the material to the d-line and a partial dispersion ratio $\theta gF$ of the material to the g- and F-lines are respectively expressed as follows:

$$vd = (nd-1)/(nF-nC) \quad (1)$$

$$\theta gF = (ng-nF)/(nF-nC) \quad (2)$$

In each of the embodiments, nd1n represents a refractive index of a first negative lens, which has the smallest Abbe number in the negative lens included in the first lens unit L1, vd1n represents an Abbe number of that first negative lens, nd1p represents a refractive index of a first positive lens, which has the smallest Abbe number in the positive lens included in the first lens unit, and d1p represents an Abbe number of that first positive lens. Then, Expressions (3) and (4) may be satisfied:

$$-0.50 \leq nd1n - (-0.014 vd1n + 2.27) \leq -0.08 \quad (3)$$

$$0.04 \leq nd1p - (-0.014 vd1p + 2.27) \leq 0.50 \quad (4)$$

Expressions (3) and (4) each express a condition for sufficiently reducing the chromatic aberration, in particular, lateral chromatic aberration.

If the value is less than the lower limit of Expression (3), the refractive index of the negative lens is relatively low. This relatively low refractive index results in a relatively large curvature of the negative lens. Consequently, it becomes difficult to correct a variety of aberrations such as a curvature of field. Moreover, this relatively large curvature makes it difficult for the optical system to have a small size. If the value is greater than the upper limit of Expression (3), a light dispersion by the negative lens is relatively low. This relatively low light dispersion causes a large lateral chromatic aberration. Consequently, it becomes difficult to correct the lateral chromatic aberration.

If the value is less than the lower limit of Expression (4), a refractive index of the positive lens is relatively low. This relatively low refractive index results in a large Petzval sum, which causes a large curvature of field and a large astigmatism. Consequently, it becomes difficult to correct the curvature of field and the astigmatism. If the value is greater than the upper limit of Expression (4), a refractive power of the positive lens is high. This high refractive power causes a large amount of spherical aberration and the like. Consequently, it becomes difficult to correct the spherical aberration and the like.

Expressions (3a) and (4a) may be satisfied instead of Expressions (3) and (4).

$$-0.45 \leq nd1n - (-0.014 vd1n + 2.27) \leq -0.08 \quad (3a)$$

$$0.05 \leq nd1p - (-0.014 vd1p + 2.27) \leq 0.30 \quad (4a)$$

Expressions (3b) and (4b) may be satisfied instead of Expressions (3a) and (4a).

$$-0.40 \leq nd1n - (-0.014 vd1n + 2.27) \leq -0.08 \quad (3b)$$

$$0.06 \leq nd1p - (-0.014 vd1p + 2.27) \leq 0.25 \quad (4b)$$

When f represents a focal length of each of the optical systems according to the embodiments being focused on the infinity object, and f1 represents a focal length of the first lens unit L1 in that focusing, Expression (5) may be satisfied.

$$0 < |f/f1| \leq 0.40 \quad (5)$$

Each of the optical systems according to the embodiments is constituted by the second lens unit L2 including the lenses disposed approximately symmetrically with respect to the aperture diaphragm SP and by the first lens unit L1. If the value is greater than the upper limit of Expression (5), the refractive powers of the lenses are arranged asymmetrically with respect to the aperture diaphragm SP. This asymmetric arrangement of the refractive powers causes a large lateral chromatic aberration. Consequently, it becomes difficult to correct the lateral chromatic aberration.

Expression (5a) may be satisfied instead of Expression (5).

$$0.02 < |f/f1| \leq 0.35 \quad (5a)$$

Expression (5b) may be satisfied instead of Expression (5a).

$$0.04 < |f/f1| \leq 0.20 \quad (5b)$$

In each of the embodiments, when fn represents a focal length of one of the negative lens that is included in the first lens unit L1 and has the smallest Abbe number (i.e., the first negative lens), Expression (6) may be satisfied.

$$0.25 \leq |f/f1n| \leq 2.00 \quad (6)$$

Expression (6) expresses a condition for sufficiently reducing the lateral chromatic aberration so as to achieve a high optical performance. If the value is less than the lower limit of Expression (6), the refractive power of the negative lens is relatively low, which leads to insufficient correction of the lateral chromatic aberration. If the value is greater than the upper limit of Expression (6), the refractive power of the negative lens is relatively high. This relatively high refractive power causes a large lateral chromatic aberration in the first lens unit, which leads to excessive correction of the lateral chromatic aberration.

Expression (6a) may be satisfied instead of Expression (6).

$$0.35 \leq |f/f1n| \leq 1.50 \quad (6a)$$

Expression (6b) may be satisfied instead of Expression (6a).

$$0.45 \leq |f/f1n| \leq 1.00 \quad (6b)$$

In each of the embodiments, when θgF1n represents a partial dispersion ratio of one of the negative lens that is included in the first lens unit L1 and has the smallest Abbe number (i.e., the first negative lens) to the g- and F-lines, Expression (7) may be satisfied.

$$0 < \theta gF1n - (-0.001682 v d1n + 0.6438) < 0.05 \quad (7)$$

Expression (7) expresses a condition for correcting the lateral chromatic aberration, in particular, for sufficiently reducing second order spectra on a shorter wavelength side of the lateral chromatic aberration to achieve a high optical performance. If the value is less than the lower limit of Expression (7), the lateral chromatic aberration on the shorter wavelength side has a negative value, which leads to insufficient correction of the second order spectra. If the value is greater than the upper limit of Expression (7), the lateral chromatic aberration on the shorter wavelength side has a positive value, which leads to excessive correction of the second order spectra.

Expression (7a) may be satisfied instead of Expression (7).

$$0.002 < \theta gF1n - (-0.001682 v d1n + 0.6438) < 0.04 \quad (7a)$$

Expression (7b) may be satisfied instead of Expression (7a).

$$0.006 < \theta gF1n - (-0.001682 v d1n + 0.6438) < 0.025 \quad (7b)$$

In each of the embodiments, when θgF1p represents a partial dispersion ratio of one of the positive lens that is included in the first lens unit L1 and has the smallest Abbe number (i.e., the first positive lens) with respect to the g- and F-lines, Expression (8) may be satisfied.

$$-0.05 < \theta gF1p - (-0.001682 v d1p + 0.6438) < 0.008 \quad (8)$$

Expression (8) expresses a condition for correcting the lateral chromatic aberration, in particular, for sufficiently reducing the second order spectra on the shorter wavelength side of the lateral chromatic aberration to achieve a high optical performance. If the value is less than the lower limit of Expression (8), the lateral chromatic aberration on the shorter wavelength side is under-corrected or the correction of the second order spectra runs short. If the value is greater than the upper limit of Expression (8), the lateral chromatic aberration on the shorter wavelength side is overcorrected or the second order spectra are excessively corrected.

Expression (8a) may be satisfied instead of Expression (8).

$$-0.03 < \theta gF1p - (-0.001682 v d1p + 0.6438) < 0.007 \quad (8a)$$

Expression (8b) may be satisfied instead of Expression (8a).

$$-0.02 < \theta gF1p - (-0.001682 v d1p + 0.6438) < 0.006 \quad (8b)$$

In each of the embodiments, vd2p represents an Abbe number of a positive lens in the second lens unit L2, and θgF2p represents a partial dispersion ratio of the positive lens to the g- and F-lines, Expression (9) may be satisfied.

$$0.01 < \theta gF2p - (-0.001682 v d2p + 0.6438) < 0.50 \quad (9)$$

Expression (9) expresses a condition for correcting a longitudinal chromatic aberration and the lateral chromatic aberration, in particular, for sufficiently reducing their second order spectra to achieve a high optical performance. If the value is less than the lower limit of Expression (9), the second order spectra on the shorter wavelength side is insufficiently corrected. If the value is greater than the upper limit of Expression (9), the second order spectra on the shorter wavelength side are excessively corrected.

Expression (9a) may be satisfied instead of Expression (9).

$$0.01 < \theta gF2p - (-0.001682 v d2p + 0.6438) < 0.40 \quad (9a)$$

Expression (9b) may be satisfied instead of Expression (9a).

$$0.012 < \theta gF2p - (-0.001682 v d2p + 0.6438) < 0.30 \quad (9b)$$

In each of the embodiments, when Lp represents a distance along the optical axis from the lens surface that is the closest to the object to the aperture diaphragm SP, and L1n represents a distance along the optical axis from the lens surface that is the closest to the object to the one of the negative lens that is included in the first lens unit L1 and has the smallest Abbe number (i.e., the first negative lens), Expression (10) may be satisfied.

$$0 \leq L1n/Lp \leq 0.40 \quad (10)$$

Expression (10) expresses a condition for correcting the lateral chromatic aberration, in particular, for sufficiently reducing the second order spectra of the lateral chromatic aberration on the shorter wavelength side to achieve a high optical performance. Since the distances L1n and Lp each have a positive value, L1n/Lp is always higher than the lower limit of Expression (10). If L1n/Lp is greater than the upper limit of Expression (10), a height of a pupil paraxial ray is relatively low. This relatively low height of the pupil paraxial ray reduces an effect of correcting the lateral chromatic aberration, which leads to the insufficient correction of the lateral chromatic aberration.

Expression (10a) may be satisfied instead of Expression (10).

$$0 \leq L1n/Lp \leq 0.35 \quad (10a)$$

Expression (10b) may be satisfied instead of Expression (10a) is more suitable.

$$0 \leq L1n/Lp \leq 0.25 \quad (10b)$$

In each of the embodiments, when Rf represents a radius of curvature of a surface on the image side of one of the lenses that is included in the second lens unit L2 and located on the object side of the aperture diaphragm SP, and Rr represents a radius of curvature of a surface on the object side of one of the lenses that is located on the image side of the aperture diaphragm SP, Expressions (11) and (12) may be satisfied.

$$0.25 < |Rf/f| < 2.0 \quad (11)$$

$$0.25 < |Rr/f| < 1.5 \quad (12)$$

Expressions (11) and (12) each express a condition for sufficiently reducing coma aberration and the astigmatism to achieve a high optical performance. If the values are less than the lower limits of Expressions (11) and (12), a large coma aberration is caused. Consequently, it becomes difficult to correct the coma aberration. If the values are greater than the upper limits of Expressions (11) and (12), a large astigmatism is caused. Consequently, it becomes difficult to correct the astigmatism.

Expressions (11a) and (12a) may be satisfied instead of Expressions (11) and (12).

$$0.50 < |Rf/f| < 1.60 \quad (11a)$$

$$0.40 < |Rr/f| < 1.00 \quad (12a)$$

Expressions (11b) and (12b) may be satisfied instead of Expressions (11a) and (12a).

$$0.50 < |Rf/f| < 1.40 \quad (11b)$$

$$0.40 < |Rr/f| < 0.80 \quad (12b)$$

[Embodiment 1]

The optical system according to Embodiment 1 (Numerical Example 1) illustrated in FIG. 1A is constituted by, in order from the object side to the image side, the first lens unit L1 with the negative refractive power, and the second lens unit L2 with the positive refractive power. The second lens unit L2 is constituted by, in order from the object side to the image side, a lens unit (sub lens unit) L2a with a positive refractive power, and a lens unit (sub lens unit) L2b with a positive refractive power that includes the aperture diaphragm. The two sub lens units each have a concave lens surface that faces the aperture diaphragm, and are disposed approximately symmetrically to each other on both sides of the aperture diaphragm. In focusing from the infinity object to a short-distance object, the first lens unit L1 is not moved, and the lens units L2a and L2b are moved toward the object side as shown by arrows.

Since the lens unit L2a and the lens unit L2b are moved in a floating manner in which a distance between them varies, variations in the aberrations in the focusing can be restrained.

In this embodiment, a first lens is a negative lens in the first lens unit that has the smallest Abbe number, and a third lens is a positive lens in the first lens unit that has the smallest Abbe number. An eighth lens disposed on the object side of the aperture diaphragm is made of a high-dispersion material having a partial dispersion ratio θgF with a relatively low value. This composition consequently reduces the longitudinal chromatic aberration. Since a ninth lens disposed on the image side of the aperture diaphragm is made of a material having a high refractive index and a high dispersion, the curvature and the coma aberration on a sagittal plane can be reduced.

[Embodiment 2]

The optical system according to Embodiment 2 (Numerical Example 2) illustrated in FIG. 2A is constituted by, in order from the object side to the image side, the first lens unit L1 with the positive refractive power, and the second lens unit L2 with the positive refractive power. The second lens unit L2 is constituted by, in order from the object side to the image side, a lens unit L2a with a positive refractive power, and a lens unit L2b with a positive refractive power that includes the aperture diaphragm. In focusing from the infinity object to a short-distance object, the first lens unit L1 is not moved, and the lens units L2a and L2b are moved toward the object side as shown by arrows.

Since the lens unit L2a and the lens unit L2b are moved in a floating manner in which a distance between them varies, variations in the aberrations in the focusing can be restrained.

In this embodiment, a first lens is one of the negative lens in the first lens unit that has the smallest Abbe number, and a third lens is one of the positive lens in the first lens unit that has the smallest Abbe number.

[Embodiment 3]

A lens configuration of the optical system according to Embodiment 3 (Numerical Example 3) illustrated in FIG. 3A is approximately the same as that in Embodiment 1. In this embodiment, a first lens is one of the negative lens in the first lens unit that has the smallest Abbe number, and a second lens is one of the positive lens in the first lens unit that has the smallest Abbe number.

[Embodiment 4]

A lens configuration of the optical system according to Embodiment 4 (Numerical Example 4) illustrated in FIG. 4A is approximately the same as that in Embodiment 1. In this embodiment, a first lens is one of the negative lens in the first lens unit that has the smallest Abbe number, and a third lens is one of the positive lens in the first lens unit that has the smallest Abbe number. An eighth lens disposed on the object side of the aperture diaphragm is made of a high-dispersion material having a partial dispersion ratio θgF with a relatively low value. This composition consequently reduces the longitudinal chromatic aberration. A ninth lens disposed on an image side of the aperture diaphragm is made of a material having a high refractive index and a high dispersion, which consequently decreases a curvature of the ninth lens so as to reduce the coma aberration on a sagittal plane.

This embodiment uses, as an optical material that satisfies Expression (9), a solid material mixed with inorganic oxide nanoparticles. Examples of the optical material that satisfies Expression (9) include a glass material, resin, and the solid material mixed with the inorganic oxide nanoparticles. For the mixture with the inorganic oxide nanoparticles, $TiO_2$ nanoparticles, ITO (Indium-Tin-Oxide) nanoparticles, or the like may be dispersed in the solid material in an appropriate volume ratio.

When scattering is taken into consideration, the nanoparticles may have a diameter of 2 to 50 nm. In order to prevent the nanoparticles from coagulating, a dispersion agent or the like may be added to them. In the mixture containing the dispersed nanoparticles, a refractive index $n(\lambda)$ at a wavelength $\lambda$ can be derived from an expression based on Maxwell-Garnet theory.

$$\varepsilon_{av} = \left[1 + \frac{3\eta\left(\frac{\varepsilon_p - \varepsilon_m}{\varepsilon_p + 2\varepsilon_m}\right)}{1 - \eta\left(\frac{\varepsilon_p - \varepsilon_m}{\varepsilon_p + 2\varepsilon_m}\right)}\right] \quad (13)$$

where $\varepsilon_{av}$ denoting a function of the wavelength $\lambda$ represents a dielectric constant of the mixture, $\varepsilon_p$ represents a dielectric constant of the nanoparticles and the like dispersed, $\varepsilon_m$ represents a dielectric constant of a base material that disperses the nanoparticles and the like, and $\eta$ represents a fraction of a total volume of the nanoparticles and the like to a volume of the base material. The refractive index $n(\lambda)$ can be calculated based on the dielectric constant of the mixture at each wavelength, by using Expression (14):

$$n(\lambda) = \sqrt{\varepsilon_{av}(\lambda)} \quad (14)$$

A method of forming the mixture, and the material of the mixture are not limited to those described above as long as Expression (9) is satisfied.

Next follows a description of Numerical Examples 1 to 4 corresponding to Embodiments 1 to 4. In each of the numerical examples, i represents order from the object side of each of optical surfaces, ri represents a radius of curvature of an i-th (optical) surface from the object side, di represents a distance (separation) between the i-th surface and an i+1-th surface, and ni and vi respectively represent a refractive index and an Abbe number of a material of an i-th optical member to the d line.

When X represents a displacement amount from a surface vertex in an optical axis direction, h represents a height from an optical axis in a direction orthogonal to the optical axis, r represents a paraxial radius of curvature, k represents a conic constant, and B, C, D, E, . . . represent aspheric coefficients whose orders are mutually different, an aspheric shape is expressed as:

$$x(h) = \frac{h^2/r}{1 + \sqrt{1 - (1+k)(h/r)^2}} + Bh^4 + Ch^6 + Dh^8 + Eh^{10} + \cdots$$

In each of values, "E±XX" denotes "×10$^{\pm XX}$."

BF represents a distance from a final lens surface to an image plane (i.e., back focus). Table 1 summarizes physical properties values of illustrative materials applicable to each of the optical systems according to the embodiments (UV-curing (meta-) acrylic monomer 1 and $TiO_2$ nanoparticles, and a mixture of them). Table 2 summarizes values of expressions (3) to (12) in numerical examples 1 to 4.

NUMERICAL EXAMPLE 1

| SURFACE NUMBER | r | d | nd | vd | EFFECTIVE DIAMETER |
|---|---|---|---|---|---|
| 1 | 182.363 | 2.87 | 1.67270 | 32.1 | 55.82 |
| 2 | 33.914 | 7.80 | | | 47.20 |
| 3 | 130.344 | 2.45 | 1.58144 | 40.8 | 47.11 |
| 4 | 47.887 | 4.40 | | | 45.42 |
| 5 | 94.747 | 3.26 | 2.00100 | 29.1 | 45.68 |
| 6 | 411.908 | 0.28 | | | 45.50 |
| 7 | 68.084 | 3.45 | 1.58313 | 59.4 | 44.77 |
| 8* | 36.999 | 4.44 | | | 42.65 |
| 9 | 62.119 | 5.32 | 1.91082 | 35.3 | 42.52 |
| 10 | −1298.618 | (VARIABLE) | | | 42.01 |
| 11 | 36.777 | 5.61 | 1.83481 | 42.7 | 34.45 |
| 12 | 487.292 | 4.42 | | | 33.77 |
| 13 | 72.572 | 1.62 | 1.59522 | 67.7 | 29.54 |
| 14 | 129.103 | 1.47 | 1.74000 | 28.3 | 28.97 |
| 15 | 27.831 | (VARIABLE) | | | 26.61 |
| 16 (DIAPHRAGM) | ∞ | 7.59 | | | 25.38 |
| 17 | −18.774 | 1.60 | 1.84666 | 23.8 | 24.65 |
| 18 | 583.408 | 5.42 | 1.91082 | 35.3 | 28.64 |
| 19 | −38.067 | 0.47 | | | 29.94 |
| 20 | 89.125 | 7.25 | 1.59522 | 67.7 | 31.82 |
| 21 | −34.835 | 0.15 | | | 32.15 |
| 22* | −86.069 | 3.39 | 1.85400 | 40.4 | 32.88 |
| 23 | −42.302 | 39.05 | | | 33.90 |
| IMAGE PLANE | ∞ | | | | |

DATA OF ASPHERIC SURFACE

EIGHTH SURFACE

K = 0.00000e+000 B = −3.12577e−006 C = −1.15654e−009
D = −8.46367e−012 E = 1.42353e−014 F = −1.06630e−017

TWENTY-SECOND SURFACE

K = 0.00000e+000 B = −6.95173e−006 C = −4.24366e−010
D = −8.48206e−012 E = 8.67675e−015

VARIOUS DATA

| | |
|---|---|
| FOCAL LENGTH | 34.30 |
| F-NUMBER | 1.4 |
| FIEDL ANGLE | 32.24 |
| IMAGE HEIGHT | 21.64 |
| ENTIRE LENGTH OF LENS | 126.07 |
| BF | 39.05 |

| OBJECT DISTANCE | INFINITY | 1750 | 1000 | 500 | 300 |
|---|---|---|---|---|---|
| d10 | 5.31 | 4.83 | 4.42 | 3.33 | 1.40 |
| d15 | 8.44 | 8.19 | 7.97 | 7.34 | 6.08 |

| | |
|---|---|
| POSITION OF ENTRANCE PUPIL | 35.14 |
| POSITION OF EXIT PUPIL | −42.55 |
| POSITION OF FRONT-SIDE PRINCIPAL POINT | 55.02 |
| POSITION OF REAR-SIDE PRINCIPAL POINT | 4.75 |

DATA OF LENS UNITS

| UNIT | INITIAL SURFACE | FOCAL LENGTH | LENGTH OF LENS | POSITION OF FRONT-SIDE PRINCIPAL POINT | POSITION OF REAR-SIDE PRINCIPAL POINT |
|---|---|---|---|---|---|
| 1 | 1 | −364.96 | 34.28 | −83.47 | −143.64 |
| 2 | 11 | 124.73 | 13.11 | −22.46 | −26.86 |
| 3 | 16 | 41.56 | 25.87 | 23.00 | 8.97 |

-continued

| DATA OF SINGLE LENS | | |
|---|---|---|
| LENS | INITIAL SURFACE | FOCAL LENGTH |
| 1 | 1 | −62.42 |
| 2 | 3 | −131.63 |
| 3 | 5 | 122.30 |
| 4 | 7 | −144.90 |
| 5 | 9 | 65.21 |
| 6 | 11 | 47.38 |
| 7 | 13 | 275.51 |
| 8 | 14 | −48.24 |
| 9 | 17 | −21.46 |
| 10 | 18 | 39.40 |
| 11 | 20 | 43.02 |
| 12 | 22 | 94.05 |

NUMERICAL EXAMPLE 2

| SURFACE NUMBER | r | d | nd | vd | EFFECTIVE DIAMETER |
|---|---|---|---|---|---|
| 1 | 566.494 | 2.59 | 1.84666 | 23.8 | 53.97 |
| 2 | 39.737 | 6.58 | | | 47.46 |
| 3 | 121.013 | 3.52 | 1.58313 | 59.4 | 47.42 |
| 4* | 48.234 | 12.50 | | | 46.29 |
| 5 | 81.457 | 7.64 | 2.00100 | 29.1 | 48.83 |
| 6 | −130.112 | (VARIABLE) | | | 48.51 |
| 7 | 59.439 | 3.79 | 1.88300 | 40.8 | 37.59 |
| 8 | 363.856 | 11.14 | | | 37.08 |
| 9 | 227.235 | 5.79 | 1.80400 | 46.6 | 30.75 |
| 10 | −34.813 | 1.49 | 1.73800 | 32.3 | 30.06 |
| 11 | 45.739 | (VARIABLE) | | | 27.09 |
| 12 (DIAPHRAGM) | ∞ | 6.15 | | | 26.06 |
| 13 | −21.393 | 1.50 | 1.78472 | 25.7 | 25.50 |
| 14 | 149.913 | 4.91 | 1.72916 | 54.7 | 28.53 |
| 15 | −52.780 | 1.04 | | | 29.58 |
| 16 | 82.184 | 7.53 | 1.59522 | 67.7 | 31.62 |
| 17 | −36.228 | 0.21 | | | 32.74 |
| 18* | −331.187 | 4.09 | 1.85400 | 40.4 | 34.09 |
| 19 | −55.434 | 39.00 | | | 35.00 |
| IMAGE PLANE | ∞ | | | | |

DATA OF ASPHERIC SURFACE

FOURTH SURFACE $K = 0.00000e+000$ $B = -1.24791e-006$ $C = -1.47222e-009$
$D = 1.06536e-012$ $E = -1.31255e-015$

EIGHTEENTH SURFACE $K = 0.00000e+000$ $B = -5.97888e-006$ $C = -3.83650e-011$
$D = -9.52349e-012$ $E = 1.07757e-014$

VARIOUS DATA

| FOCAL LENGTH | 34.30 |
|---|---|
| F-NUMBER | 1.45 |
| FIELD ANGLE | 32.24 |
| IMAGE HEIGHT | 21.64 |
| ENTIRE LENGTH OF LENS | 132.20 |
| BF | 39.00 |

| OBJECT DISTANCE | INFINITY | 1750 | 1000 | 500 | 300 |
|---|---|---|---|---|---|
| d6 | 7.12 | 6.35 | 5.75 | 4.26 | 2.36 |
| d11 | 5.63 | 5.68 | 5.68 | 5.44 | 4.05 |

| POSITION OF ENTRANCE PUPIL | 34.98 |
|---|---|
| POSITION OF EXIT PUPIL | −37.75 |
| POSITION OF FRONT-SIDE PRINCIPAL POINT | 53.95 |
| POSITION OF REAR-SIDE PRINCIPAL POIINT | 4.70 |

-continued

DATA OF LENS UNITS

| UNIT | INITIAL SURFACE | FOCAL LENGTH | LENGTH OF LENS | POSITION OF FRONT-SIDE PRINCIPAL POINT | POSITION OF REAR-SIDE PRINCIPAL POINT |
|---|---|---|---|---|---|
| 1 | 1 | 456.27 | 32.83 | 179.88 | 251.65 |
| 2 | 7 | 219.75 | 22.21 | −44.58 | −51.26 |
| 3 | 12 | 44.36 | 25.41 | 22.83 | 9.29 |

DATA OF SINGLE LENS

| LENS | INITIAL SURFACE | FOCAL LENGTH |
|---|---|---|
| 1 | 1 | −50.59 |
| 2 | 3 | −140.03 |
| 3 | 5 | 50.97 |
| 4 | 7 | 79.99 |
| 5 | 9 | 37.92 |
| 6 | 10 | −26.58 |
| 7 | 13 | −23.77 |
| 8 | 14 | 54.09 |
| 9 | 16 | 43.27 |
| 10 | 18 | 77.43 |

NUMERICAL EXAMPLE 3

| SURFACE NUMBER | r | d | nd | vd | EFFECTIVE DIAMETER |
|---|---|---|---|---|---|
| 1 | −700.505 | 2.62 | 1.69895 | 30.1 | 53.60 |
| 2 | 32.576 | 8.34 | | | 45.75 |
| 3 | 136.865 | 3.56 | 2.00100 | 29.1 | 45.94 |
| 4 | −1317.089 | 0.26 | | | 45.86 |
| 5 | 145.725 | 3.43 | 1.58313 | 59.4 | 45.50 |
| 6* | 45.072 | 8.39 | | | 44.15 |
| 7 | 81.709 | 5.43 | 1.91082 | 35.3 | 44.14 |
| 8 | −240.566 | (VARIABLE) | | | 43.77 |
| 9 | 43.026 | 5.48 | 1.91082 | 35.3 | 36.12 |
| 10 | 7621.861 | 4.55 | | | 35.50 |
| 11 | 95.284 | 2.96 | 1.59522 | 67.7 | 30.91 |
| 12 | −244.543 | 1.53 | 1.74077 | 27.8 | 30.15 |
| 13 | 33.283 | (VARIABLE) | | | 27.45 |
| 14 (DIAPHRAGM) | ∞ | 7.67 | | | 25.93 |
| 15 | −19.692 | 1.64 | 1.84666 | 23.8 | 25.00 |
| 16 | −652.845 | 4.03 | 1.88100 | 40.1 | 28.37 |
| 17 | −47.159 | 1.34 | | | 29.39 |
| 18 | 106.269 | 7.23 | 1.59522 | 67.7 | 31.67 |
| 19 | −33.447 | 0.15 | | | 32.01 |
| 20* | −135.606 | 3.98 | 1.85400 | 40.4 | 33.23 |
| 21 | −43.580 | 39.05 | | | 34.26 |
| IMAGE PLANE | ∞ | | | | |

DATA OF ASPHERIC SURFACE

SIXTH SURFACE

K = 0.00000e+000 B = −3.19409e−006 C = −2.62532e−009
D = −3.27178e−012 E = 6.19827e−015 F = −7.76719e−018

TWENTIETH SURFACE

K = 0.00000e+000 B = −6.89700e−006 C = −6.69346e−010
D = −5.15360e−012 E = 2.55311e−015

VARIOUS DATA

| | |
|---|---|
| FOCAL LENGTH | 34.40 |
| F-NUMBER | 1.45 |
| FIELD ANGLE | 32.17 |
| IMAGE HEIGHT | 21.64 |

|  |  | -continued |  |  |  |
|---|---|---|---|---|---|
|  | ENTIRE LENGTH OF LENS |  |  | 125.44 |  |
|  | BF |  |  | 39.05 |  |

| OBJECT DISTANCE | INFINITY | 1750 | 1000 | 500 | 300 |
|---|---|---|---|---|---|
| d 8 | 5.66 | 5.08 | 4.61 | 3.37 | 1.36 |
| d13 | 8.15 | 7.99 | 7.84 | 7.32 | 6.05 |

| POSITION OF ENTRANCE PUPIL | 32.50 |
|---|---|
| POSITION OF EXIT PUPIL | −44.51 |
| POSITION OF FRONT-SIDE PRINCIPAL POINT | 52.73 |
| POSITION OF REAR-SIDE PRINCIPAL POINT | 4.65 |

| UNIT | INITIAL SURFACE | FOCAL LENGTH | LENGTH OF LENS | POSITION OF FRONT-SIDE PRINCIPAL POINT | POSITION OF REAR-SIDE PRINCIPAL POINT |
|---|---|---|---|---|---|
| 1 | 1 | −408.34 | 32.02 | −110.75 | −186.95 |
| 2 | 9 | 115.32 | 14.52 | −21.07 | −26.30 |
| 3 | 14 | 43.76 | 26.04 | 24.30 | 10.14 |

| DATA OF SINGLE LENS | | |
|---|---|---|
| LENS | INITIAL SURFACE | FOCAL LENGTH |
| 1 | 1 | −44.47 |
| 2 | 3 | 124.01 |
| 3 | 5 | −113.33 |
| 4 | 7 | 67.51 |
| 5 | 9 | 47.49 |
| 6 | 11 | 115.57 |
| 7 | 12 | −39.46 |
| 8 | 15 | −24.01 |
| 9 | 16 | 57.52 |
| 10 | 18 | 43.58 |
| 11 | 20 | 73.73 |

NUMERICAL EXAMPLE 4

| SURFACE NUMBER | r | d | nd | vd | EFFECTIVE DIAMETER |
|---|---|---|---|---|---|
| 1 | 480.322 | 2.82 | 1.67270 | 32.1 | 55.79 |
| 2 | 36.983 | 6.74 |  |  | 47.80 |
| 3 | 119.552 | 2.46 | 1.51742 | 52.4 | 47.72 |
| 4 | 42.361 | 5.06 |  |  | 45.90 |
| 5 | 90.295 | 4.27 | 1.90366 | 31.3 | 46.24 |
| 6 | −18601.026 | 0.15 |  |  | 46.10 |
| 7 | 93.603 | 3.43 | 1.58313 | 59.4 | 45.43 |
| 8* | 39.044 | 4.01 |  |  | 43.41 |
| 9 | 62.996 | 5.50 | 1.91082 | 35.3 | 43.38 |
| 10 | −756.556 | (VARIABLE) |  |  | 42.91 |
| 11 | 37.467 | 5.79 | 1.83481 | 42.7 | 34.86 |
| 12 | 779.999 | 3.27 |  |  | 34.14 |
| 13 | 72.301 | 2.99 | 1.59522 | 67.7 | 30.47 |
| 14 | −1236.876 | 1.50 | 1.72825 | 28.5 | 29.64 |
| 15 | 28.912 | (VARIABLE) |  |  | 26.78 |
| 16 (DIAPHRAGM) | ∞ | 7.36 |  |  | 25.30 |
| 17 | −18.879 | 1.64 | 1.84666 | 23.8 | 24.50 |
| 18 | 197.444 | 1.21 | 1.69934 | 26.4 | 28.47 |
| 19 | −209.968 | 3.90 | 1.91082 | 35.3 | 28.61 |
| 20 | −42.029 | 0.27 |  |  | 29.63 |
| 21 | 92.376 | 7.48 | 1.59522 | 67.7 | 31.68 |
| 22 | −33.657 | 0.15 |  |  | 32.00 |
| 23* | −106.635 | 3.88 | 1.85400 | 40.4 | 33.05 |
| 24 | −41.586 | 39.05 |  |  | 34.12 |
| IMAGE PLANE | ∞ |  |  |  |  |

-continued

DATA OF ASPHERIC SURFACE

EIGHTH SURFACE

K = 0.00000e+000 B = −3.29635e−006 C = −1.06088e−009
D = −8.09890e−012 E = 1.33588e−014 F = −9.49240e−018
TWENTY-THIRD SURFACE

K = 0.00000e+000 B = −6.98994e−006 C = −7.36799e−010
D = −7.33127e−012 E = 6.43354e−015

VARIOUS DATA

| | |
|---|---|
| FOCAL LENGTH | 34.30 |
| F-NUMBER | 1.45 |
| FIELD ANGLE | 32.24 |
| IMAGE HEIGHT | 21.64 |
| ENTIRE LENGTH OF LENS | 127.48 |
| BF | 39.05 |

| OBJECT DISTANCE | INFINITY | 1750 | 1000 | 500 | 300 |
|---|---|---|---|---|---|
| d10 | 5.93 | 5.48 | 5.09 | 3.97 | 1.70 |
| d15 | 8.60 | 8.30 | 8.07 | 7.45 | 6.48 |

| | |
|---|---|
| POSITION OF ENTRANCE PUPIL | 34.66 |
| POSITION OF EXIT PUPIL | −43.12 |
| POSITION OF FRONT-SIDE PRINCIPAL POINT | 54.64 |
| POSITION OF REAR-SIDE PRINCIPAL POINT | 4.75 |

| UNIT | INITIAL SURFACE | FOCAL LENGTH | LENGTH OF LENS | POSITION OF FRONT-SIDE PRINCIPAL POINT | POSITION OF REAR-SIDE PRINCIPAL POINT |
|---|---|---|---|---|---|
| 1 | 1 | −396.15 | 34.44 | −96.68 | −163.46 |
| 2 | 11 | 116.60 | 13.56 | −20.89 | −25.39 |
| 3 | 16 | 42.30 | 25.90 | 23.59 | 10.19 |

DATA OF SINGLE LENS

| LENS | INITIAL SURFACE | FOCAL LENGTH |
|---|---|---|
| 1 | 1 | −59.72 |
| 2 | 3 | −128.19 |
| 3 | 5 | 99.45 |
| 4 | 7 | −117.60 |
| 5 | 9 | 64.05 |
| 6 | 11 | 46.98 |
| 7 | 13 | 114.86 |
| 8 | 14 | −38.77 |
| 9 | 17 | −20.28 |
| 10 | 18 | 145.68 |
| 11 | 19 | 57.06 |
| 12 | 21 | 42.38 |
| 13 | 23 | 77.69 |

TABLE 1

| | ng | nF | nd | nC | vd | θgF |
|---|---|---|---|---|---|---|
| UV-CURABLE (META-) ACRYLIC MONOMER 1 | 1.53706 | 1.53133 | 1.52415 | 1.52116 | 51.55 | 0.563 |
| TiO$_2$ NANOPARTICLE | 2.45676 | 2.37452 | 2.30377 | 2.28032 | 13.84 | 0.873 |
| UV-CURABLE (META-) ACRYLIC MONOMER 1 TiO$_2$ 25v % | 1.73891 | 1.71882 | 1.69934 | 1.69232 | 26.38 | 0.758 |

TABLE 2

| | EMBODIMENT | | | |
|---|---|---|---|---|
| | 1 | 2 | 3 | 4 |
| (3) | −0.15 | −0.09 | −0.15 | −0.15 |
| (4) | 0.14 | 0.14 | 0.14 | 0.07 |
| (5) | 0.09 | 0.08 | 0.08 | 0.09 |
| (6) | 0.55 | 0.68 | 0.77 | 0.57 |
| (7) | 0.009 | 0.017 | 0.010 | 0.009 |
| (8) | 0.005 | 0.005 | 0.005 | 0.004 |
| (9) | 0.014 | 0.014 | 0.014 | 0.158 |
| (10) | 0.00 | 0.00 | 0.00 | 0.00 |
| (11) | 0.81 | 1.33 | 0.97 | 0.84 |
| (12) | 0.55 | 0.62 | 0.57 | 0.55 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-234952, filed on Nov. 19, 2014, which is hereby incorporated by reference herein in its entirety.

What is claimed is:

1. An optical system comprising, in order from an object side to an image side, a first lens unit, and a lens group including at least one lens unit, the lens group having a positive refractive power as a whole,
   wherein distances between adjacent lens units vary during focusing,
   wherein the first lens unit includes a positive lens,
   wherein one of lenses of the first lens unit is the closest to the object side and has a negative refractive power,
   wherein the lens group includes a positive lens and an aperture diaphragm,
   wherein one of lenses that is included in the lens group, located on the object side or the image side of the aperture diaphragm and the closest to the aperture diaphragm has a concave lens surface that faces the aperture diaphragm, and
   wherein when nd1n represents a refractive index of a first negative lens having the smallest Abbe number in the negative lens included in the first lens unit, vd1n represents the Abbe number of the first negative lens, nd1p represents a refractive index of a first positive lens having the smallest Abbe number in the positive lens included in the first lens unit, vd1p represents the Abbe number of the first positive lens, and vd2p represents an Abbe number of the positive lens of the lens group, and θgF2p represents a partial dispersion ratio of the positive lens of the lens group with respect to a g line and an F line, the following conditions are satisfied:

$-0.50 \leq nd1n - (-0.014 vd1n + 2.27) \leq -0.08$;

$0.04 \leq nd1p - (-0.014 vd1p + 2.27) \leq 0.50$; and $0.01 < \theta gF2p - (-0.001682 vd2p + 0.6438) < 0.50$.

2. The optical system according to claim 1, wherein when f represents a focal length of the optical system being focused on an infinity object, and f1 represents a focal length of the first lens unit, the following condition is satisfied:

$0 < |f/f1| \leq 0.40$.

3. The optical system according to claim 1, wherein when f1n represents a focal length of the first negative lens, the following condition is satisfied:

$0.25 \leq |f/f1n| \leq 2.00$.

4. The optical system according to claim 1, wherein when θgF1n represents a partial dispersion ratio of the first negative lens to a g-line and F-line, the following condition is satisfied:

$0 < \theta gF1n - (-0.001682 vd1n + 0.6438) < 0.05$.

5. The optical system according to claim 1, wherein when θgF 1p represents a partial dispersion ratio of the first positive lens with respect to a g line and an F line, the following condition is satisfied:

$-0.05 < \theta gF1p - (-0.001682 vd1p + 0.6438) < 0.008$.

6. The optical system according to claim 1, wherein when Lp represents a distance along an optical axis from a lens surface of the lens that is included in the optical system and the closest to an object to the aperture diaphragm, L1n represents a distance along the optical axis from the lens surface of the lens that is included in the optical system and the closest to the object to the first negative lens, the following condition is satisfied:

$0 \leq L1n/Lp \leq 0.40$.

7. The optical system according to claim 1, wherein when Rf represents a radius of curvature of a surface on the image side of one of the lenses that is included in the lens group and located on the object side of the aperture diaphragm, and Rr represents a radius of curvature of a surface on the object side of one of the lenses that is included in the lens group and located on the image side of the aperture diaphragm, the following conditions are satisfied:

$0.25 < |Rf/f| < 2.0$; and $0.25 < |Rr/f| < 1.5$.

8. The optical system according to claim 1, wherein the lens group includes, on both sides of the aperture diaphragm, two lens units each having a positive refractive power and
   wherein each of a lens unit located on the object side of the aperture diaphragm in the lens group and a lens unit located on the image side of the aperture diaphragm in the lens group has a concave lens surface that faces the aperture diaphragm, the concave lens surface being the closest to the aperture diaphragm.

9. An optical apparatus comprising:
   an optical system, and
   an image sensor that photoelectrically converts an image formed by the optical system,
   wherein the optical system includes, in order from an object side to an image side, a first lens unit, and a lens group including at least one lens unit, the lens group having a positive refractive power as a whole,
   wherein distances between adjacent lens units vary during focusing,
   wherein the first lens unit includes a positive lens,
   wherein one of lenses of the first lens unit is the closest to the object side and has a negative refractive power,
   wherein the lens group includes a positive lens and an aperture diaphragm,
   wherein one of lenses that is included in the lens group, located on the object side or the image side of the aperture diaphragm and the closest to the aperture diaphragm has a concave lens surface that faces the aperture diaphragm, and
   wherein when nd1n represents a refractive index of a first negative lens having the smallest Abbe number in the negative lens included in the first lens unit, vd1n represents the Abbe number of the first negative lens, nd1p represents a refractive index of a first positive lens having the smallest Abbe number in the positive lens included in the first lens unit, vd1p represents the Abbe number of the first positive lens, and vd2p represents an Abbe number of the positive lens of the lens group, and θgF2p represents a partial dispersion ratio of the positive lens of the lens group with respect to a g line and an F line, the following conditions are satisfied:

$-0.50 \leq nd1n - (-0.014 vd1n + 2.27) \leq -0.08$;

$0.04 \leq nd1p - (-0.014 vd1p + 2.27) \leq 0.50$ and $0.01 < \theta gF2p - (-0.001682 vd2p + 0.6438) < 0.50$.

10. An optical system comprising, in order from an object side to an image side, a first lens unit, and a lens group including at least one lens unit, the lens group having a positive refractive power as a whole,
  wherein distances between adjacent lens units vary during focusing,
  wherein the first lens unit includes a positive lens,
  wherein one of lenses of the first lens unit is the closest to the object side and has a negative refractive power,
  wherein the lens group includes a plurality of lenses and an aperture diaphragm,
  wherein an object side lens surface of a lens that is included in the lens group and disposed adjacent to the image side of the aperture diaphragm is a concave shape that faces the aperture diaphragm,
  wherein an image side lens surface of a lens that is included in the lens group and disposed adjacent to the object side of the aperture diaphragm is a concave shape that faces the aperture diaphragm, and
  wherein when $nd1n$ represents a refractive index of a first negative lens having the smallest Abbe number in the negative lens included in the first lens unit, $vd1n$ represents the Abbe number of the first negative lens, $nd1p$ represents a refractive index of a first positive lens having the smallest Abbe number in the positive lens included in the first lens unit, and $vd1p$ represents the Abbe number of the first positive lens, the following conditions are satisfied:

$$-0.50 \leq nd1n-(-0.014vd1n+2.27) \leq -0.08; \text{ and}$$

$$0.04 \leq nd1p-(-0.014vd1p+2.27) \leq 0.50.$$

11. An optical apparatus comprising:
an optical system according to claim 10, and
an image sensor that photoelectrically converts an image formed by the optical system.

* * * * *